Aug. 7, 1928.
J. C. BARRETT
VARIABLE ELECTRICAL CONDENSER
Filed Dec. 12, 1925
1,680,239
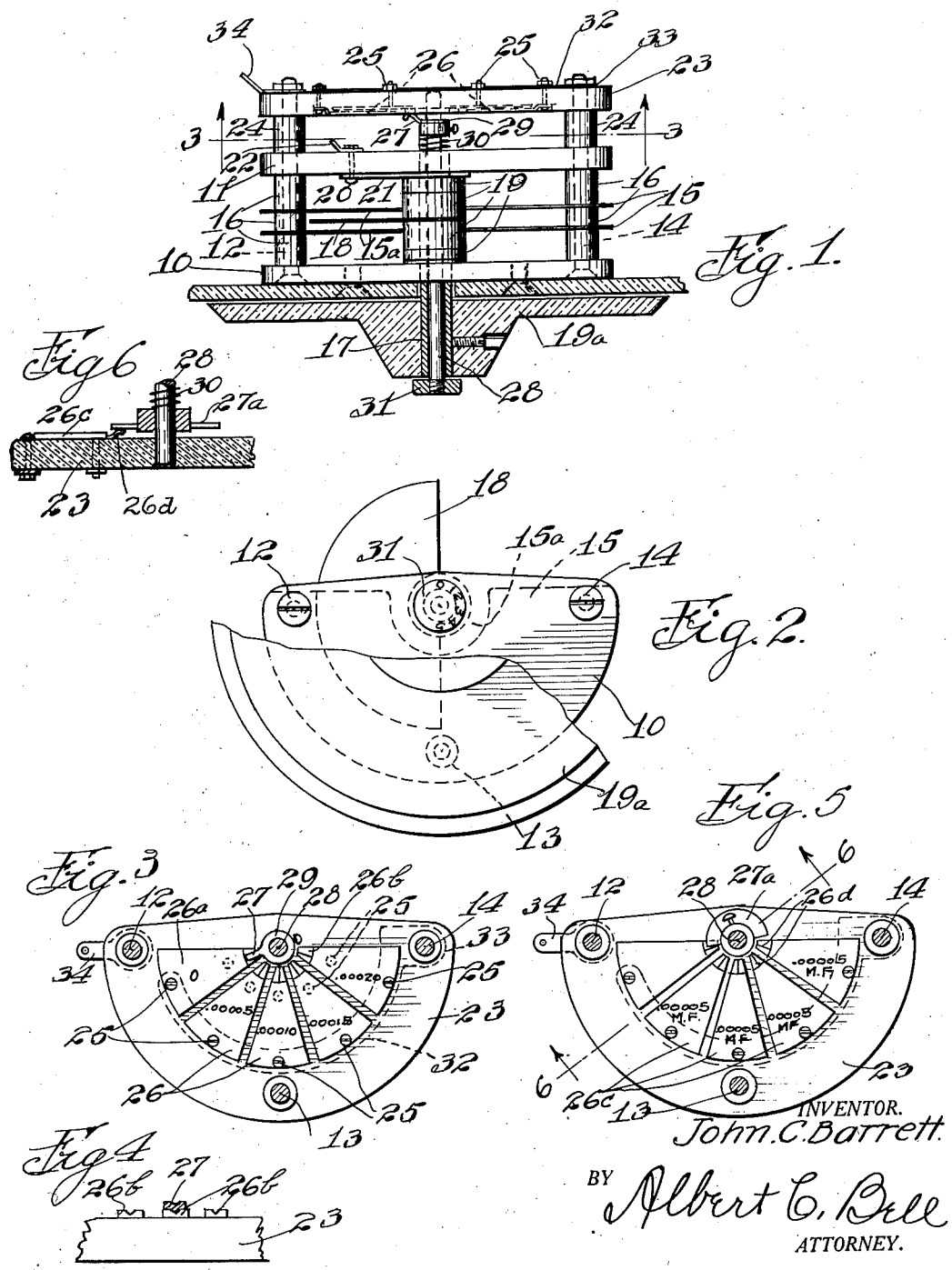
INVENTOR.
John C. Barrett.
BY Albert C. Bell
ATTORNEY.

Patented Aug. 7, 1928.

1,680,239

UNITED STATES PATENT OFFICE.

JOHN C. BARRETT, OF CHICAGO, ILLINOIS.

VARIABLE ELECTRICAL CONDENSER.

Application filed December 12, 1925. Serial No. 74,929.

My invention relates to an improved construction of variable electrical condenser adapted particularly for use in radio systems and for allied purposes.

Heretofore variable condensers for the purposes under consideration, have been constructed in various ways and at the present time as far as I am aware, the construction of condensers of this general nature which is most favorably regarded, is that employing two sets of flat metal plates, provided with mechanism of one kind or another to move the plates of one set relatively to the plates of the other set so that they will interleave to a greater or less extent, the plates being spaced as closely together as mechanical conditions will permit to insure that the plates of one set do not touch the plates of the other set during the interleaving action. While condensers of this kind give very satisfactory results when they are well constructed, there are several objections to them, which it is the purpose of the present invention to overcome. In the first place, the maximum capacity of such a condenser cannot be made very large without resulting in a construction of large size or bulk, on account of the plates necessarily being placed a substantial distance from each other. Again, where a considerable number of plates is employed, the amount of movement of one set relatively to the other is necessarily small to produce an appreciable capacity variation as reflected by the effect, for example in tuning a radio set, thus requiring very delicate operation of the condenser and more or less training to permit the operator to secure the necessary facility to properly operate the condenser. I am aware that condensers of this type have been built heretofore with two sets of main interleaving plates constituting the principal part of the condenser and an additional plate or vernier, separately operable to secure delicate adjustments. While condensers of this type afford a certain degree of satisfaction, they are open to the objection that the vernier plate or plates, on account of mechanical considerations, cannot at any time be sufficiently separated and isolated from the main sets of plates and the electro-static field surrounding them to insure efficient operation of the vernier plate or plates. Furthermore with condensers of the interleaving plate type, even though the maximum capacity of the condenser may be known, it is difficult if not impossible to determine what electrical capacity is being employed in the circuit connected with the condenser for any intermediate position or relation of the interleaving plates below the maximum capacity of the condenser.

By my invention I provide a construction consisting of a single compact mounting that may readily and conveniently be constructed in any desired manner well known in the art, to produce efficient mechanical and electrical operation and for this device I provide two controls, one associated with a series of fixed condensers, preferably of known capacity each, and a second condenser of the variable interleaving type operated by the second control, the latter having preferably a total capacity that is very small in comparsion with the total capacity of the condenser as a whole. In practice I prefer to use for the interleaving section of the condenser two, or at the most three plates, one of them being movable and the other or others stationary. By means of the first control referred to, I may connect in circuit a desired fixed capacity, or no capacity at all, and for any selection established by the first control I may by the second control place an additional capacity in circuit by exceedingly small increments, to facilitate adjusting the condenser with great accuracy under any and all conditions. I find that the fixed condensers can readily be selected so that the difference between the capacity of any one of them and the next one of the series is substantially equal to the capacity of the variable section of my condenser, and as a result by the use of the two controls, the maximum range of the condenser as a whole may be covered in very small increments by the variable section of the condenser. For example the first control may have a first position for which it connects no capacity in circuit, and the series of fixed condensers may have values of .00005 mf., .0001 mf., .00015 mf., .0002 mf., etc. and the variable section of the condenser may be constructed to have a maximum capacity of .00005 mf., the number of fixed condensers being limited only by the space available to mount them, and the total capacity desired in the condenser. In using the condenser in connection with any circuit, if the operator has no knowledge of the setting required for any particular condition, the second control is actuated from zero to maximum with the first control on its open or zero position; if this does not give the adjustment required, the first control is moved to the first condenser of the series of fixed condensers, and the second control is again actuated through its entire range, and so on until the desired setting or adjustment is secured. In this manner I provide a large motion of the second control for a small total amount of capacity variation and this accurate adjustment is available at any point throughout the entire capacity range of the condenser for the purpose of accurately adjusting it. Furthermore by selecting the series of fixed condensers of known and established value, the amount of capacity connected in the circuit by the condenser for any particular setting, may be determined with a fair degree of accuracy at any time without the use of measuring instruments, which is advantageous under some conditions of operation. The series of fixed condensers may be mounted compactly and occupy but small space, the interleaving plate section of the condenser, consisting of but few plates, occupies but small space and may readily be mounted sufficiently remote from the series of fixed condensers so that there is substantially no electro-static interaction between them and the entire construction readily lends itself to the most approved types of mechanical construction and insulation for the purpose of securing low loss and accurate performance.

It is obvious that the first control mechanism and the series of fixed condensers may be arranged in a number of different ways, as far as the particular manner of mounting the condensers is concerned and as far also as the particular capacity of the several condensers and the switching means employed to control their inclusion in the circuit of the instrument are concerned.

My invention will best be understood by reference to accompanying drawings showing a preferred embodiment thereof in which Fig. 1 shows my condenser construction in plan view, Fig. 2 shows the construction of Fig. 1 in front elevation with the operating controls broken away, Fig. 3 is a sectional view of the parts shown in Fig. 1 taken along the line 3—3, Fig. 4 is a detail view of the switching mechanism shown in Fig. 3 to an enlarged scale, this view showing an inside end view of the contact ends of several of the fixed condensers, Fig. 5 shows in a view similar to Fig. 3 a modified fixed condenser and switching mechanism arrangement, and Fig. 6 is a sectional view of the parts shown in Fig. 5 taken along the line 6—6. Similar numerals refer to similar parts throughout the several views.

As shown in Figs. 1 and 2, my improved condenser consists of plates of insulating material 10 and 11 secured in parallel spaced relation, by threaded rods or screws 12, 13 and 14, and on these rods, flat plates of metal 15, which are semicircular in form, are mounted to comprise the stator portion of the variable condenser section of my device, these plates being substantially parallel with the mounting plates 10 and 11 midway between them, and held in spaced relation by metallic collars or sleeves 16. The plates 10 and 11 form the bearings for a metal sleeve or shaft 17, substantially co-axial with the circular outer edges of the plates 15 and this sleeve carries a flat metal plate of semicircular conformation as indicated at 18, midway between the plates 15, in which position the plate is securely held by collars 19 carried by and secured to the sleeve 17. The upper edges of the plates 15 are provided at their central portions as indicated in Figs. 1 and 2, with semicircular clearances 15$^a$ to insure proper electro-static separation between the plates 15 and the metal collars 19. The plate 18 thus comprises the rotor of the variable section of my improved condenser and this plate may be conveniently rotated with the sleeve 17 by any suitable device for example a dial 19$^a$ secured thereto. The plate 11 has secured thereto by a screw or bolt 20, a flat metal spring 21 of brass or other conducting material which presses against the end collar 19 to impart the desired holding friction to the rotor of the condenser, and the screw 20 also secures to the plate 11 a lug 22 to facilitate electrical connection with the said rotor.

The rods 12, 13 and 14 are extended beyond the plate 11 and through a third plate of insulating material 23, which is held in spaced relation back of the plate 11 and parallel thereto by spacing collars 24. The plate 23 has mounted on its inner surface by means of screws 25, a series of fixed condensers 26 provided at their inner ends with contacts, each connected with one terminal of the corresponding condenser, to be engaged by a switch arm 27 secured to a metal operating rod or shaft 28 contained in the tubular shaft 17 and having a sliding fit therewith, the end of the rod 28 extending beyond the switch 27 and having an end bearing in the plate 23. The switch 27 may be carried by a collar 29 on the rod 28 as indicated and secured thereto by a suitable set screw, and between the collar 29 and the plate 11, a spring 30 is disposed around the rod 28 to hold the switch 27 firmly in engagement with a selected condenser contact. The outer end of the rod 28 is provided with an operating knob 31 by which the switch 27 may be turned, which operation is preferably accomplished by first moving the rod axially against the action of the spring 30 and then rotating the rod to bring the switch 27 into alignment with a desired one of the condenser contacts, at which time the rod 28 is permitted to again move axially under the action of the spring 30 to produce a firm contact between the switch 27 and the selected one of the condenser contacts. As indicated in Fig. 2, the knob 31 may carry convenient indications to show which one of the condenser contacts has been selected and is in engagement with the switch 27. The outer ones of the screws 25 extend through a metal connecting strip 32 provided at one end with a lug 33 engaged and clamped by the nut on the rod 14, thus electrically connecting one terminal of each of the fixed condensers 26 with the stator plates of the variable section of the condenser, the outer ones of the screws 25 being each in electrical connection with a terminal of one of the fixed condensers. The nut on the rod 12 may conveniently clamp a lug 34 to the plate 23 to facilitate making electrical connection with the stator plates and outer terminals of the fixed condensers.

The arrangement of the fixed condensers on the plate 23 is shown in Fig. 3. The condensers may conveniently have capacities differing by the same amount each from the one preceding it in the series, for example as indicated by the capacity values noted on the condensers in Fig. 3, although it will be understood that these condensers may have any convenient capacity values as may be desired, and to permit the condenser as a whole to be variable from practically zero to the maximum capacity of the condenser, the first fixed condenser space indicated at 26ª may be a blank affording merely a zero position for the switch 27, or the switch 27 may have a zero position angularly removed from the first fixed condenser position, as desired. The switch contacts carried by the several condensers are indicated at 26ᵇ and to insure that the switch 27 is in proper engagement with these contacts, they may be provided with depressions as indicated in Fig. 4 and the switch 27 may have a corresponding conformation to fit in said depressions.

In Fig. 5 I illustrate a somewhat different arrangement of fixed condensers as follows. In this case, I show the fixed condensers 26ᶜ as being each of the same capacity and provide the inner ends of these condensers with contact portions 26ᵈ for engaging the switch 27ᵃ mounted on the rod 28, the switch 27ᵃ in this case consisting of a semicircular disk of conducting material for engaging the contacts 26ᵈ one after another and remaining in connection with two or more of the said contacts at the same time. In other respects, the construction is the same as described above and the variable and fixed sections of my condenser as a whole may be operated in the same manner as described above. As shown in Fig. 6, with the construction illustrated in Fig. 5, I find it desirable to make the contacts 26ᵈ in the form of flat springs which are slightly depressed when engaged by the switch 27ᵃ, so that good electrical contact may be made between each of the contacts 26ᵈ covered by the switch 27ᵃ at any time. With this arrangement of fixed condensers, the several condensers may each have the same capacity as the others of said condensers, or any convenient capacity depending upon the use to which the condenser is to be put.

It will be understood that the means I have shown and described for mounting the sections of my condenser, are illustrative only and that I do not limit myself to any particular construction in so doing, the only requisite being that the two sections of my condenser shall be mounted in substantially the relation described; nor do I limit myself to any particular type, capacity, or specific relation of fixed condensers, since it will be understood that the fixed condensers may be arranged on their supporting plate in any convenient manner to permit switching one or more of them into the circuit of the condenser as a whole. I do not therefore limit myself to the particular constructions shown and described, as I may employ equivalents known to the art at the time of the filing of this application without departing from the scope of the appended claims.

What I claim is:

1. In an electrical condenser, the combination of a variable section comprising an insulating support, a flat metallic stator plate carried thereby, a flat metallic rotor plate, and a first shaft carrying said rotor plate in spaced parallel relation with said stator plate for angular movement relatively thereto, and a fixed section comprising a plurality of fixed condensers each having a switch contact forming one of its terminals, a switch for selectively engaging said contacts by a turning movement, and a second shaft carrying said switch for turning it, said second shaft being movable axially to move said switch from its contact engaging position, and a spring tending to move said second shaft and said switch to the contact engaging position of the latter.

2. In an electrical condenser, the combination of a variable section comprising an insulating support, a flat metallic stator plate carried thereby, a flat metallic rotor plate, and a first shaft carrying said rotor plate in spaced parallel relation with said stator plate for angular movement relatively thereto, and a fixed section comprising a plurality of fixed condensers each having a switch contact forming one of its terminals, a switch for selectively engaging said contacts by a turning movement, and a second shaft carrying said switch for turning it, said second shaft being movable axially to move said switch from its contact engaging position, and a spring tending to move said second shaft and said switch to the contact engaging position of the latter, said switch contacts and said switch having cooperating conformations tending to retain said switch in engagement with a selected contact.

In witness whereof, I hereunto subscribe my name this 1st day of December, A. D. 1925.

JOHN C. BARRETT.